US008359453B2

(12) United States Patent
Funk

(10) Patent No.: US 8,359,453 B2
(45) Date of Patent: Jan. 22, 2013

(54) REAL ADDRESS ACCESSING IN A COPROCESSOR EXECUTING ON BEHALF OF AN UNPRIVILEGED PROCESS

(75) Inventor: Mark R. Funk, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/880,787

(22) Filed: Sep. 13, 2010

(65) Prior Publication Data

US 2012/0066474 A1    Mar. 15, 2012

(51) Int. Cl.
*G06F 12/00* (2006.01)
(52) U.S. Cl. ...................................... 711/202
(58) Field of Classification Search .................. None
See application file for complete search history.

(56) References Cited

U.S. PATENT DOCUMENTS

| 5,027,272 | A |   | 6/1991 | Samuels |
|---|---|---|---|---|
| 5,305,446 | A |   | 4/1994 | Leach et al. |
| 5,404,445 | A | * | 4/1995 | Matsumoto ................ 345/520 |
| 5,608,888 | A |   | 3/1997 | Purcell et al. |
| 5,655,146 | A |   | 8/1997 | Baum et al. |
| 2002/0013872 | A1 |   | 1/2002 | Yamada |
| 2004/0225885 | A1 |   | 11/2004 | Grohoski et al. |
| 2006/0230223 | A1 |   | 10/2006 | Kruger et al. |
| 2006/0259734 | A1 |   | 11/2006 | Sheu et al. |
| 2008/0253395 | A1 |   | 10/2008 | Pandya |
| 2009/0106507 | A1 |   | 4/2009 | Skerlj et al. |
| 2009/0214040 | A1 |   | 8/2009 | Funk et al. |

OTHER PUBLICATIONS

H. Franke et al., "Introduction to the wire-speed processor and architecture", IBM Journal of Research & Development, vol. 54, No. 1, paper 3, Jan./Feb. 2010.

* cited by examiner

*Primary Examiner* — Hiep Nguyen
(74) *Attorney, Agent, or Firm* — Roy W. Truelson

(57) ABSTRACT

A coprocessor performs operations on behalf of processes executing in processors coupled thereto, and accesses data operands in memory using real addresses. A process executing in a processor generates an effective address for a coprocessor request, invokes the processor's address translation mechanisms to generate a corresponding real address, and passes this real address is the coprocessor. Preferably, the real address references a block of additional real addresses, each for a respective data operand. The coprocessor uses the real address to access the data operands to perform the operation. An address context detection mechanism detects the occurrence of certain events which could alter the context of real addresses used by the coprocessor or the real addresses themselves.

20 Claims, 8 Drawing Sheets

REAL ADDRESS ACCESSING IN A COPROCESSOR EXECUTING ON BEHALF OF AN UNPRIVILEGED PROCESS

FIELD OF THE INVENTION

The present invention relates to digital data processing, and in particular to methods and apparatus for operating a coprocessor to perform selective operations on behalf of processes executing in one or more processors.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which form a computer program and directs the operation of the other system components.

From the standpoint of the computer's hardware, most systems operate in fundamentally the same manner. CPUs (also called processors) are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software with enhanced function, along with faster hardware.

Many diverse innovations have improved the throughput, or amount of useful work per unit of time, which can be performed by a computer system. Among these is a class of innovations relating to parallelism. Parallelism involves using multiple copies of hardware components, and in particular multiple CPUs, to increase the throughput of the computer. Reductions in the size and cost of integrated circuitry have made it practical to include multiple CPUs in a single computer system, even to the point of including multiple CPUs or processors on a single integrated circuit chip. It can be readily understood that two processors should be able to accomplish more than a single processor having the same characteristics, that three should be able to accomplish more than two, and so on. However, this relationship is usually not a direct proportion. Multiple processors interfere with one another in their need to use memory, communications buses, and other system components, increase the complexity of assignment of processes to execute on the processors, generate additional management overhead, and so forth. The proliferation of processors introduces a range of new problems relating to these management issues.

A related development involves the use of coprocessors. A coprocessor is a digital device which performs selective operations on behalf of one or more processors. Unlike the processor, the coprocessor does not independently execute a thread of instructions and maintain thread state for determining the instruction flow. It is invoked by a processor to perform an operation on data, performs the operation asynchronously with the processor (i.e, while the processor continues to execute instructions and perform other operations), and makes results available to the processor when finished. The coprocessor is often, although not necessarily, implemented as a multiple-stage pipeline. Thus, the coprocessor has the capability to off-load some of the work from one or more processors. In many environments, the use of one or more coprocessors provides better performance than devoting an equivalent amount of hardware circuitry to additional processors, which would only further aggravate the management issues of processor parallelism.

In the case of certain coprocessor operations, it is practical to communicate a relatively small amount of input data directly over a bus from the processor to the coprocessor as the coprocessor's operation is invoked, and receive results directly from the coprocessor, storing the data temporarily in one or more buffers as needed. However, this straightforward technique limits the range and complexity of operations that can be performed by the coprocessor. It may be desirable to support an arbitrarily large volume of input data to and/or output data from the coprocessor operation, or to support operations which require data which is not known until some part of the operation is complete.

In order to support a greater range and complexity of coprocessor operations, it would be desirable to support access by the coprocessor to data in memory (including cache memory). If the coprocessor needs input data, it would be able to fetch it from memory as required; if it produces output data, it would be able to store it in memory as required.

Unfortunately, there is a problem. Almost all modern general purpose computer systems support the use of different address spaces, and some form of address translation. Each thread executing on the processor executes in the context of a respective process. The executable instructions reference memory addresses within an address space corresponding to the process. With the exception of addresses generated by a relatively small set of privileged processes which administer the computer system, these memory addresses (which are herein referred to as "effective addresses" although they may alternatively be called "virtual addresses", or by some other name) do not reference fixed physical storage locations in main memory. Some form of address translation mechanism translates the addresses used by the executing instructions to the fixed addresses of storage locations in memory (which are herein referred to as "real addresses", although they may alternatively be called "physical addresses", or by some other name).

Address translation is used for several reasons. Because the effective address space(s) can be larger than the physical address space, processes are freed from the constraints of available physical addresses. The programmer and compiler need not know in advance the amount of physical addresses available (which can vary from system to system, or within logical partitions of the same system), or the usage of physical addresses by other processes executing on the system. Finally, different address spaces are used to isolate processes from one another and thus provide a measure of security and data integrity.

A processor typically maintains thread state information and includes address translation mechanisms which enable it to translate these effective addresses to real addresses in order to access memory (including cache memory) in a secure, authorized manner. It is theoretically possible to include such mechanisms in a coprocessor, but this adds significant cost and complexity to the design. In addition to hardware logic, the address translation mechanisms usually include one or more tables, such as a translation lookaside buffer (TLB), which map effective addresses to real addresses. The information in these tables changes frequently, and duplication of the address translation mechanisms in the coprocessor requires that such information be kept current. The complexity is aggravated by the fact that the coprocessor may be shared by multiple processors, and must therefore be able to translate addresses in the context of any thread executing on any of the multiple processors, and to synchronize its address translation data with those of all the processors. This complexity is further aggravated by the fact that a coprocessor operations might be executing asynchronously relative to the process which invokes it, to the point where the invoking process may be no longer executing in the processor by the time the coprocessor completes executing on its behalf.

In order to support continuing improvements to the throughput of computer systems, and in particular to support continuing improvements to the design and capabilities of coprocessors which off-load work from one or more processors, there is a need for improved data accessing mechanisms in a coprocessor.

SUMMARY

A coprocessor performs operations on behalf of processes executing in any of one or more processors coupled thereto. The coprocessor accesses data operands in memory (which may include cache memory) using real addresses. A process executing in a processor generates an effective address to be associated with a request to the coprocessor to perform an operation. The process invokes the processor's address translation mechanisms to generate a real address corresponding to the effective address. This real address is passed to the coprocessor with a request to perform the operation. The coprocessor uses the real address to access data operands to perform the operation.

In the preferred embodiment, a process thread further generates the effective address(es) of data operands required by the coprocessor to perform the operation to be requested. For each such effective address of a data operand required by the coprocessor, the process invokes the processor's secure address translation mechanisms using a special instruction limited to that purpose to generate the corresponding real address, and stores the corresponding real address within a coprocessor request block (CRB). The coprocessor accesses the CRB using the passed real address, obtains the real address(es) of any data operands required to perform the requested operation from the CRB, and uses these addresses to access any required input and/or output operands. A hardware monitoring mechanism protects the contents of the CRB, and particularly the real addresses it contains, from unauthorized alteration. A CRB might alternatively contain data operands themselves, or a mixture of operands and real address references to operands.

In the preferred embodiment, an address context detection mechanism detects the occurrence of certain events which could alter the context of real addresses used by the coprocessor or the real addresses themselves. Preferably, the address context detection mechanism includes separate hardware address context monitors in the processor and the coprocessor. These monitors monitor and record certain events which could indicate that real address references are invalid, in particular events which could have the effect of altering the relationship between effective addresses and real addresses, or altering data within the CRB. The processor verifies address context status before sending a request to the coprocessor, and the coprocessor monitors changes to address context status which might affect operand addresses it uses. An invalid address context causes the coprocessor operation to be aborted. Alternative mechanisms for detecting relevant events affecting real address context are possible.

In the preferred embodiment, the processor's instruction set includes several special instructions to support coprocessor addressing. A first instruction, called "create reservation and clear (CRC)", zeroes the contents of a specified block of storage and applies the coprocessor reservation attribute to it. The CRC instruction is the only means of setting the coprocessor reservation. A second instruction, store real address (STRA), takes an input effective address, translates it to a real address using the processor's secure address translation mechanisms, and stores the resultant real address in a specified storage location within the CRB. Different instruction forms or different techniques for invoking the coprocessor are possible.

By receiving a real memory reference to a block, which preferably contains real addresses of operands, the coprocessor is able to access memory using real addresses, without the need to provide a separate address translation mechanism in the coprocessor, and further is provided the means to access memory in arbitrary amounts and locations, on behalf of unprivileged processes (i.e. processes which do not directly reference real addresses). Furthermore, protection mechanisms are provided for ensuring that the real addresses can not be used to access unauthorized locations in physical memory. These various mechanisms make it possible to increase the range of operations performed by the coprocessor, reduce hardware complexity, and/or increase system performance.

The details of the present invention, both as to its structure and operation, can best be understood in reference to the accompanying drawings, in which like reference numerals refer to like parts, and in which:

DETAILED DESCRIPTION

Introduction

Figure 1:
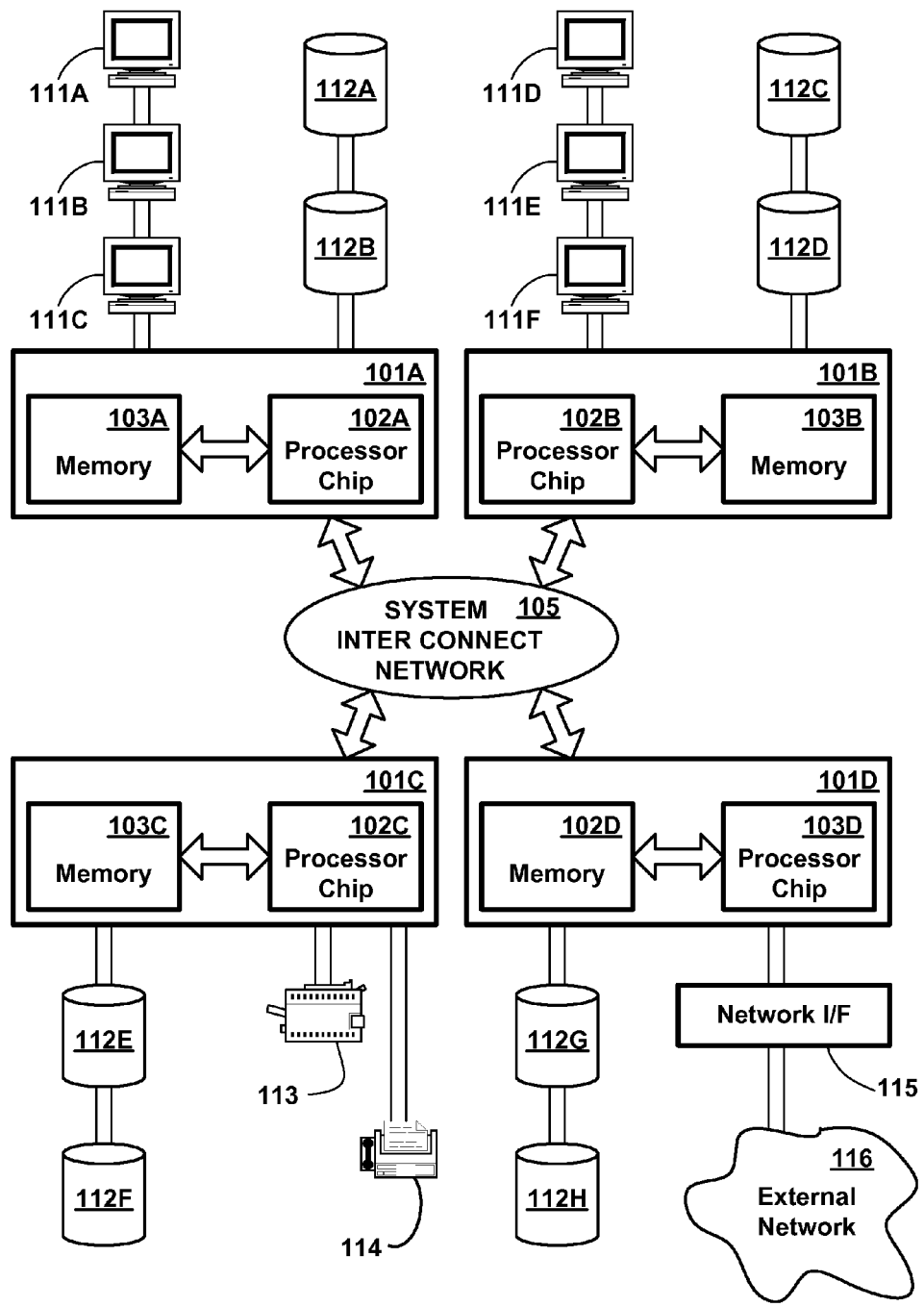
FIG. 1 is a high-level block diagram of the major hardware components of an exemplary multiprocessor computer system, according to the preferred embodiment of the present invention.

As described herein, a processor and coprocessor arrangement according to the preferred embodiment enables a coprocessor to directly access multiple operands and/or a potentially large volume of data using multiple real memory addresses, and to do so without hardware support for address translation within the coprocessor itself. This is preferably accomplished by: (a) performing secure address translation to obtain any required real addresses within the processor which issues the request using its address translation facilities; (b) passing multiple operand real addresses to the coprocessor by storing operand real addresses in a protected memory block and passing a single real address reference to the protected memory block to the coprocessor; and (c) monitoring certain events to ensure that the real addresses themselves and the real address context (i.e. mapping of relevant effective to real addresses) remains consistent throughout the period that the coprocessor is using the addresses.

The use of different address spaces and address translation is a significant aspect of the embodiments described herein. Since various terms are used in the industry and in academic circles to describe different addressing constructs, not always consistently, a brief clarification of terms used herein is in order. In general, processor-executable instructions storable in the main memory of a computer system contain embedded therein, or enable the processor to derive therefrom (by reference to a register, by adding an offset to the contents of a register, etc.), addresses in an address space corresponding to an executing process. For all but a few privileged processes, these addresses do not have any fixed correspondence to physical memory locations. The address space of the executing process is typically much larger than the number of physical memory locations, and each of multiple executing processes may have its own address space. This smaller number of physical memory locations must be shared among the larger number of addresses in the address space(s) of the executing processes. The correspondence between addresses in the larger address space(s) of executing processes to physical memory locations is subject to frequent change.

As used herein, a "real address" is an address in an address space having a fixed, persistent correspondence to physical locations in the memory of the system. In some architectures, these may be called "physical addresses", or by some other name. The "real address" refers to the same fixed physical location in memory regardless of the processor (or coprocessor) which uses it, and this fixed physical location does not change with each task, process, user, or similar parameter, nor does it change as pages are swapped in and out of storage, although in some architectures it may be possible to change the assignment of at least some real addresses by reconfiguring the system, by automated self-repair actions when some portion of memory develops a hardware fault, or similar actions which occur with relatively rare frequency. The essence of a "real address" is the fixed, persistent correspondence to physical memory locations, and not the need or lack of need for further mapping to the memory locations. For example, a "real address" may be mapped to a particular memory module and address within that module by the memory controller, or may be mapped to a particular node and location within than node in a nodal computer system. However, these mappings are generally fixed and persistent mappings.

As used herein, an "effective address" is an address in any address space for accessing memory, which has no fixed, persistent correspondence to physical locations in memory, and is therefore translated (either directly or indirectly) to a real address in order to access memory. In some architectures, these may be called "virtual addresses", or by some other name. An effective address is usually context-sensitive to a particular process, partition, or other context, although it is possible to have a single large effective address space which encompasses all processes executing on a computer system. In some architectures, there may be multiple levels of effective or virtual addresses. For example, there may be a first effective address space associated with an executing process, which is mapped to a second effective address space associated with a logical partition in which the process is executing (which is ultimately mapped to a real address corresponding to the physical memory location). An "effective address" as used herein may include any such level of effective address, however named, and regardless of the number of translation steps required.

Hardware Overview

Referring to the Drawing, wherein like numbers denote like parts throughout the several views, FIG. 1 is a high-level block diagram of the major hardware components of an exemplary multiprocessor computer system 100 in accordance with the preferred embodiment of the present invention. Computer system 100 is designed according to a Non-Uniform Memory Access (NUMA) architecture, it being understood that a computer system in accordance with the present invention need not necessarily be a NUMA system. Computer system 100 comprises multiple nodes 101A-101D (herein generically referred to as feature 101), of which four are shown in the exemplary system of FIG. 1, it being understood that the number of nodes may vary. Each node includes a processor chip 102A-D (herein generically referred to as feature 102) and a local memory 103A-103D (herein generically referred to as feature 103).

Computer system 100 utilizes a distributed main memory, a respective portion of which is in each local memory 103. Collectively, these local main memory portions constitute the main memory of computer system 100. The main memory is addressable using a single common real address space, which is shared by all CPUs throughout the system. A respective portion of the real address space is allocated to each local memory. A real address in this real address space has a fixed, persistent meaning throughout the system, i.e. means the same memory location, regardless of the node or processor using it. A processor in any node can access memory in its own node or in a different node using this real address; however, access time for accessing memory in a different node is not necessarily the same as for memory in its own node. Additionally, a portion of each local memory may be allocated as a cache for temporarily storing data from other local memory portions.

The nodes are connected to one another by an inter-nodal communications network 105 that permits any node to communicate with any other node. The purpose of inter-nodal communications network 105 is to allow devices to communicate across node boundaries, and in particular, to allow a processor in any node to access the memory resident in any other node. Inter-nodal communications network 105 may employ any technique, now known or hereafter developed, for supporting communication among multiple nodes in a computer system. Ideally, the inter-nodal communications medium should provide high bandwidth and low latency, and be scalable to allow for the addition of more nodes. Network 105 may be arranged as a set of point-to-point interconnection links, as a ring topology, as a common multi-drop bus topology, or in some other manner. Connections may be wired or wireless (e.g, optical), depending on system performance needs. As just one example, network 106 may be a switch-based network that uses the Scalable Coherent Interface (SCI) interconnection mechanism conforming to the IEEE 1596-1992 or subsequent standard. Although the inter-nodal connection is as fast as practicable given the design constraints, it is a characteristic of a NUMA architecture that it is substantially slower than communication within a node, i.e., that a processor in a given node can access its local memory faster than it can access memory in a different node.

Each node may additionally be coupled to one or more I/O devices. For example, user terminals or workstations 111A-111C are shown coupled to node 101A, and user terminals or workstations 111D-111F are shown coupled to node 101B. Direct access storage devices 112A-B, 112C-D, 112E-F and 112G-H (herein referred to generically as feature 112, which are typically rotating magnetic disk drive storage devices, although they could alternatively be other devices, including arrays of disk drives configured to appear as a single large storage device to a host) are shown coupled to nodes 101A, 101B, 101C and 101D, respectively. Printer 113 and fax machine 113 are shown coupled to node 101C. Various other or additional types of I/O devices could be used. Network interface 115 for communicating with external network 116 is shown coupled to node 101D. Network 116 may be any of various local or wide area networks known in the art. For example, network 116 may be an Ethernet local area network, or it may be the Internet. Additionally, network interface 115 might support connection to multiple networks, and/or multiple network interfaces may be present.

Figure 2:
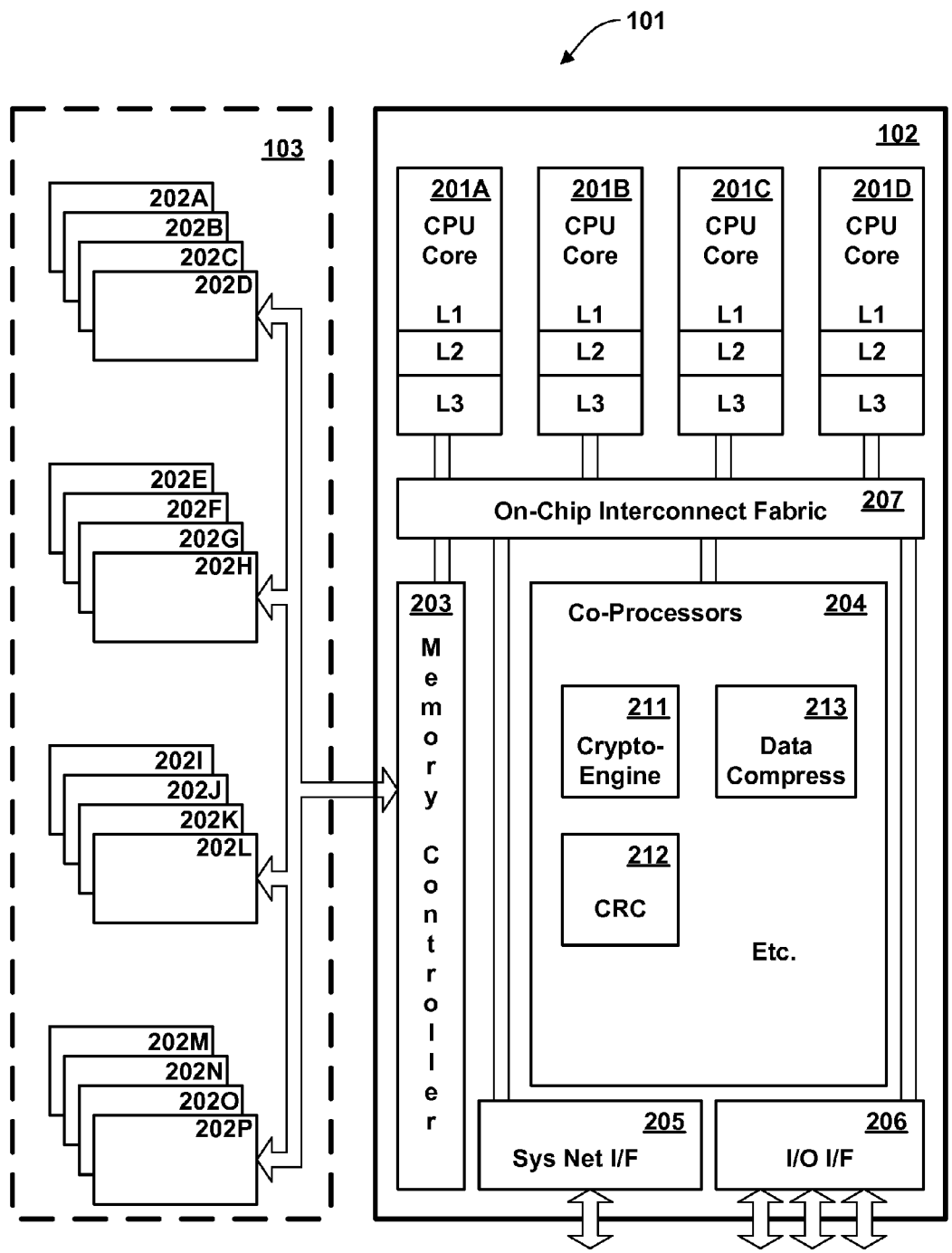
FIG. 2 is a high-level block diagram of the major hardware components of a typical node of a computer system of the preferred embodiment.

FIG. 2 is a block diagram of the major hardware components of a typical node 101 of computer system 100 in accordance with the preferred embodiment. Node 101 includes a single processor chip 102 coupled to multiple local memory chips 202A-P (herein generically referred to as feature 202), which collectively form local memory 103. Processor chip 102 comprises multiple central processing unit (CPU) cores 201A-D (herein generically referred to as feature 201, of which four are shown in FIG. 2), a memory controller/interface 203 for communicating with local memory chips 202, a set of coprocessors 204, a system network interface 205 for communicating with other nodes via system interconnect network 105, and an I/O device interface 206 for communicating with various I/O devices which are coupled to node 101 external to processor chip 102. An on-chip interconnect fabric 207 provides communication paths internal to processor chip 102 among the multiple components of the processor chip; although illustrated in FIG. 2 as a single entity, on-chip interconnect fabric 207 may comprise multiple buses or other communication paths, which may be dedicated or shared, and arranged according to any appropriate topology now known or hereafter developed. Physically, node 101 is preferably implemented as multiple integrated circuit chips, including processor chip 102 and memory chips 202, mounted on a single circuit card, and having embedded printed circuit connections running among the various chips.

Each CPU core 201 independently performs basic machine processing functions to execute one or more threads of instructions stored in main memory, and maintains its state independently of the other CPU cores. Each CPU core thus contains all the required elements of a central processing unit; it is referred to herein as a "CPU core" or "core" because multiple such CPU cores are implemented on a single integrated circuit processor chip. Each CPU core preferably contains or controls a respective set of L1, L2 and L3 caches for temporary storage of data and instructions. Caches could alternatively be shared among multiple CPU cores. For example, each CPU core may contain a respective level 1 instruction cache (L1 I-cache) and a respective level 1 data cache (L1 D-cache) while a lower level cache such as an L3 cache might be shared by more than one CPU core.

Coprocessor set 204 contains one or more coprocessors 211-213 which perform auxiliary functions on behalf of processes executing in CPU cores 201. Each coprocessor contains hardware logic for performing a particular function or set of functions. A coprocessor is shared among the various CPU cores 201, and is not dedicated to use by any one CPU core. A CPU core uses a coprocessor to perform a corresponding function by passing input parameters to the coprocessor and receiving resultant data, as described in greater detail herein. FIG. 2 illustrates three coprocessors in coprocessor set 204, including a crypto-engine 211, a cyclic redundancy check (CRC) function 212, and a data compression function 213. Additional exemplary functions could include anything from a simple memory mover to a very complex XML parser. These functions are shown and described herein as illustrative examples and are not to be construed as limiting the type of functions which may be performed by a coprocessor, it being understood that a coprocessor set could include other or additional functions, and/or that duplicate copies of one or more of the coprocessors 211-213 may exist.

It should be understood that FIGS. 1 and 2 are intended to depict the representative major components of system 100 at a high level, that individual components may have greater complexity than represented in FIGS. 1 and 2, that components other than or in addition to those shown in FIGS. 1 and 2 may be present, that the number, type and configuration of such components may vary, and that a large computer system will typically have more components than represented in FIGS. 1 and 2. Several particular examples of such additional complexity or additional variations are disclosed herein, it being understood that these are by way of example only and are not necessarily the only such variations.

While a system having four nodes is shown in FIG. 1, and a typical node having four CPUs and various other devices is shown in FIG. 2, it should be understood that FIGS. 1 and 2 are intended only as a simplified example of one possible configuration of a system for illustrative purposes, that the number and types of possible devices in such a configuration may vary, and that the system often includes additional devices not shown. In particular, it would alternatively be possible to construct a complete system with a single node, in which all main memory is contained in that node and all I/O devices are coupled to that node, or using some other architecture which is not a NUMA architecture. It would further be possible to construct a system having only a single CPU per node. In addition, while a certain packaging arrangement is depicted in which multiple CPU cores and certain associated cache structures are present on a single chip, it will be understood that there are many variations in packaging arrangement, and that entities shown on the same chip could be implemented on different chips and vice-versa. In particular, although a coprocessor is preferably packaged with multiple CPU cores on a single chip, the coprocessor could be packaged on a separate chip. Furthermore, while a large system typically contains multiple CPUs, the present invention is not limited to systems of any particular size, and it would be possible to construct a system having only a single CPU and associated co-processor(s). Furthermore, while co-processors 204 are separate from processor cores 201 and shared by multiple cores in the representative embodiment of FIG. 2, each processor core could alternatively have its own dedicated co-processor or co-processors. It should further be understood that, if multiple nodes are present, it is not required that all nodes be identically configured, that all nodes have the same number of CPUs or the same amount of addressable local memory, or that all nodes have attached I/O buses and I/O devices.

While certain I/O paths are shown connecting the I/O devices to their respective nodes, I/O paths or buses may be shared by devices or dedicated in any combination. Although the I/O device are shown distributed among various nodes, it would be possible to attach all I/O devices to a single node or subset of nodes. Computer system 100 depicted in FIG. 1 has multiple attached terminals 11A-111F, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention.

Figure 3:
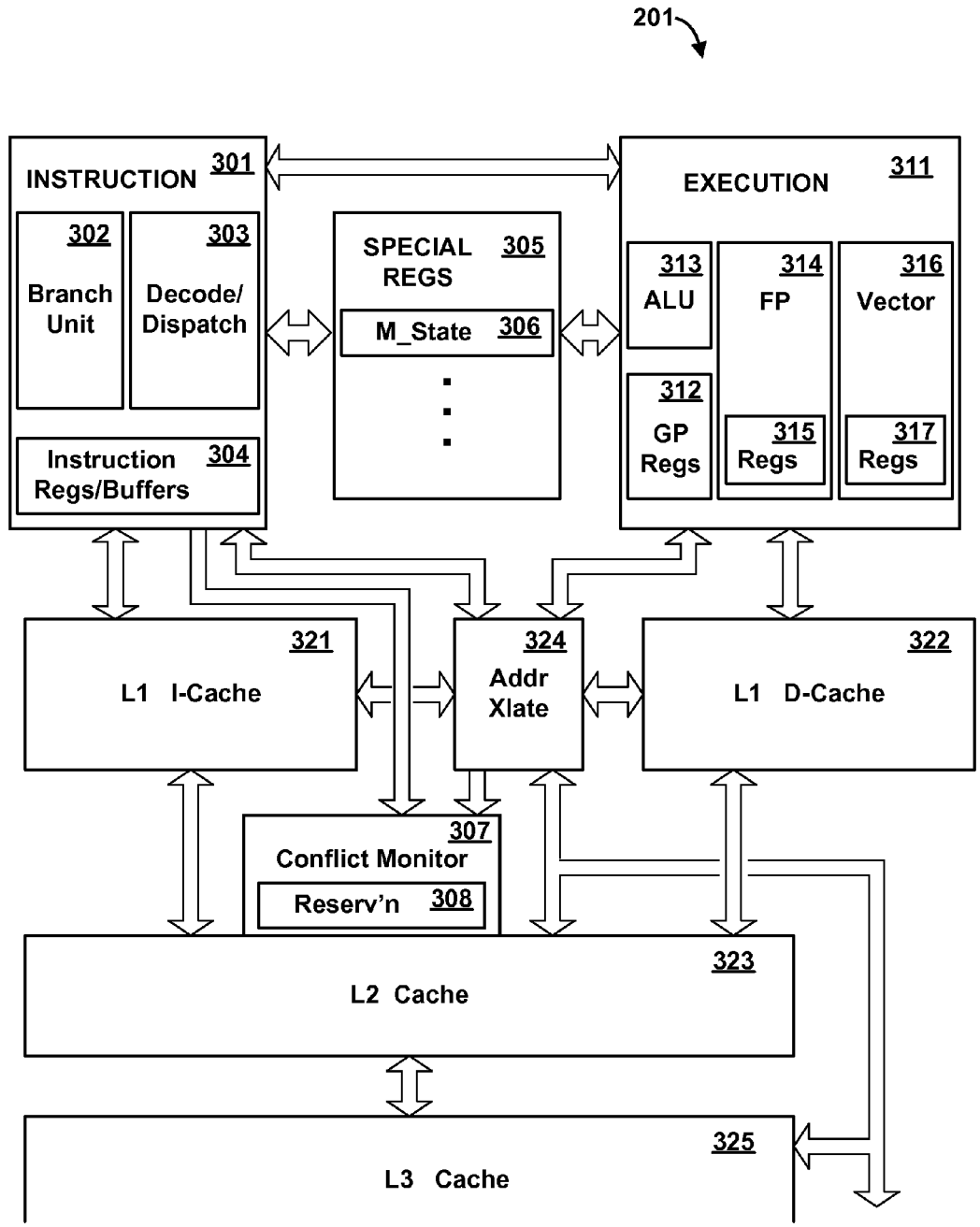
FIG. 3 is a high-level diagram of the major components of a CPU core including certain associated cache structures, according to the preferred embodiment.

FIG. 3 is a high-level diagram of the major components of a CPU core 201 including certain associated cache structures, according to the preferred embodiment, showing CPU core 201 in greater detail than is depicted in FIG. 2. CPU core 201 includes instruction unit portion 301, special register portion 305, and execution unit portion 311. Also shown in FIG. 3 are Level 1 Instruction Cache (L1 I-Cache) 321, Level 1 Data Cache (L1 D-Cache) 322, Level 2 Cache (L2 Cache) 323, Address Translation unit 324, Level 3 Cache (L3 Cache 325, and reservation conflict monitor 307. In general, instruction unit 301 obtains instructions from L1 I-cache 321, decodes instructions to determine operations to perform, and resolves branch conditions to control program flow. Execution unit 311 performs arithmetic and logical operations on data in registers, and loads or stores data from L1 D-Cache 322. Special registers 305 contain various state data for controlling instruction flow and proper operation of the CPU, other than the instructions and data operands themselves. L2 Cache 323 is a level 2 cache, generally larger that L1 I-Cache 321 or L1 D-Cache 322, providing data to L1 I-Cache 321 and L1 D-Cache 322. L2 Cache 323 obtains data from a lower level L3 cache 325, or from main memory through an external interface.

Caches at any level are logically extensions of main memory. In the exemplary embodiment, L1, L2 and L3 caches are packaged on the same integrated circuit chip as the CPU core, and for this reason are sometimes considered a part of the CPU core. In this embodiment, each CPU core has its own respective L1, L2 and L3 caches, which are not shared with other cores. The representation of FIG. 3 is intended to be typical, and is not intended to limit the present invention to any particular physical or logical cache implementation. It will be recognized that processors and caches could be designed according to different arrangements, and the processor chip or chips may include more caches or fewer caches than represented in FIG. 3.

Instruction unit 301 comprises branch unit 302, instruction decode/dispatch unit 303, and instruction registers and buffers 304. Instructions from L1 I-cache 321 are loaded into buffers 304 prior to execution. Depending on the CPU design, there may be multiple buffers (e.g., buffers for different threads, or within a thread, one for a sequential series of instructions, and others for branch-to locations), each of which may contain multiple instructions. Decode/dispatch unit 303 selects one or more instructions to be dispatched for execution from one or more of buffers 304 in a current machine cycle, and decodes the instruction(s) to determine the operation(s) to be performed or branch conditions. Branch unit 302 controls the program flow by evaluating branch conditions, and refills buffers 304 from L1 I-cache 321.

Execution unit 311 comprises a set of general purpose registers 312 for storing data and a scalar arithmetic logic unit (ALU) 313 for performing arithmetic and logical operations on data in GP registers 312 responsive to instructions decoded by instruction unit 301. Execution unit further includes floating point operations subunit 314, and a vector execution subunit 316. Floating point subunit 314 is a special floating point hardware pipeline for performing floating point operations using double-precision (64-bit) operands. Vector execution subunit 316 performs certain vector operations in parallel, i.e., performs a common operation on multiple operands in parallel. Although referred to herein as a vector execution subunit, this is merely descriptive of potential capability. In fact, vector subunit 316 simply performs mathematical operations on data, and can be used for any or various applications requiring mathematically intensive operations. Floating point subunit 314 and vector subunit 316 each includes its own respective set of registers 315, 317. In addition to components shown in FIG. 3, execution unit 311 may include additional logic, counters, control hardware, and so forth. The execution unit components illustrated and described are exemplary only, and it will be understood that not all execution unit components described herein may be present or that execution unit 311 may include other and additional execution pipelines or other components; in fact, functions such as vector processing could be performed in a coprocessor.

Special registers 305 contain state data other than instructions (contained in instruction registers 304) and general purpose data upon which instructions operate (contained in registers 312, 315, 317). For example, special registers 305 may include condition registers containing operation result flags which are used for determining branch conditions, interrupt vectors, error indications, and so forth. In particular, in accordance with the preferred embodiment, special registers include a machine state register 306. Machine state register 306 includes data indicating a privilege level of a currently executing thread; these include a hypervisor level corresponding to a thread having privileges of a logical partition manager (hypervisor), and one or more levels corresponding to threads which do not have hypervisor privileges. If CPU core 201 supports concurrent execution of multiple threads, a separate privilege level may exist for each currently executing thread.

Reservation conflict monitor 307 is associated with L2 Cache 323 and monitors events affecting a coprocessor request block (CRB) in the cache. Conflict monitor 307 includes reservation data 308 indicating the validity of a reservation, the address of the CRB, CRB block size, and any other essential information about the reservation. There could be multiple sets of reservation data 308, enabling processor core 201 to support multiple concurrent requests to one or more coprocessors (for example, a separate reservation corresponding to each thread of multiple concurrently executing threads). Reservation conflict monitor 307 detects the occurrence of certain events which could affect the address context of real addresses in a coprocessor request, or the real addresses themselves. The occurrence of such an event causes the conflict monitor to indicate an invalid reservation in the reservation data 308, as explained in further detail herein.

L1 I-cache 321 and L1 D-cache 322 are separate instruction and data caches providing data to instruction and execution units. L2 cache 323 and L3 cache 325 are non-discriminated caches containing both instructions and non-instruction data. Typically, data is taken from or stored to an L1 cache by the instruction or execution unit, and if the data is unavailable in an L1 cache, it is loaded into the L1 cache from L2 cache 323, which in turn obtains it from L3 cache 325 or external memory. Depending on the processor design, it may be possible to by-pass a cache at one level and load data from a lower level cache or memory.

Address translation unit 324 translates effective addresses (in some architectures, called "virtual addresses" or some other name) generated by instruction unit 301 or execution unit 311 to corresponding real addresses in memory. As is known in the art, a fundamental difference exists between effective addresses on the one hand, and real addresses on the other. An effective address has no fixed correspondence to a physical memory location; this correspondence changes as new pages are loaded into main memory from storage, as processes change, and so forth. A real address corresponds to a fixed physical memory location, although it does not necessarily translate directly to the location. The processor generates effective addresses (which may be called "virtual" or some other term) in an effective address space corresponding to each respective executing process. The effective addresses are further translated to "real addresses", corresponding to the actual memory locations at which the data is located by address translation unit 324. It will be understood that various computer architectures employ different addressing constructs, and the present invention is not limited to any particular form of addressing.

Address translation unit 324 is represented as a single logical entity, but typically includes multiple tables and logic circuitry, which may be distributed in various chip locations. For example, an address translation mechanism may include a translation look-aside buffer, an effective-to-real address translation table, a segment table, and additional structures. Additionally, separate structures could be used for translation of instructions and for non-instruction data. Although address translation unit 324 is represented in FIG. 3 as a part of CPU core 201, some or all of the components which perform address translation may be located outside the processor core, and/or may be shared by multiple processors. It is further understood that address translation unit 324 will return only a valid, authorized real address (or no address at all) in response to an attempt to translate a given effective address from a given effective address space, and thus an executing process can not use the address translation unit to obtain arbitrary real addresses which are being used by other processes and to which it is not authorized. Various such address translation mechanisms are known in the art, and are beyond the scope of the present disclosure.

CPU core 201 may be a multithreaded processor supporting the concurrent execution of multiple threads and simultaneous dispatching of instructions from different threads in the same machine cycle, or it may be a single threaded processor. Where multi-threading is supported, a separate set of most registers exists for each thread. I.e., a separate set of general purpose registers 312, floating point registers 315, and vector registers 317, exists for each thread. Additionally, certain other state or special purpose registers may be duplicated to support multiple active threads. The execution unit pipeline hardware, the instruction unit, and the caches are shared by all threads.

Figure 4:
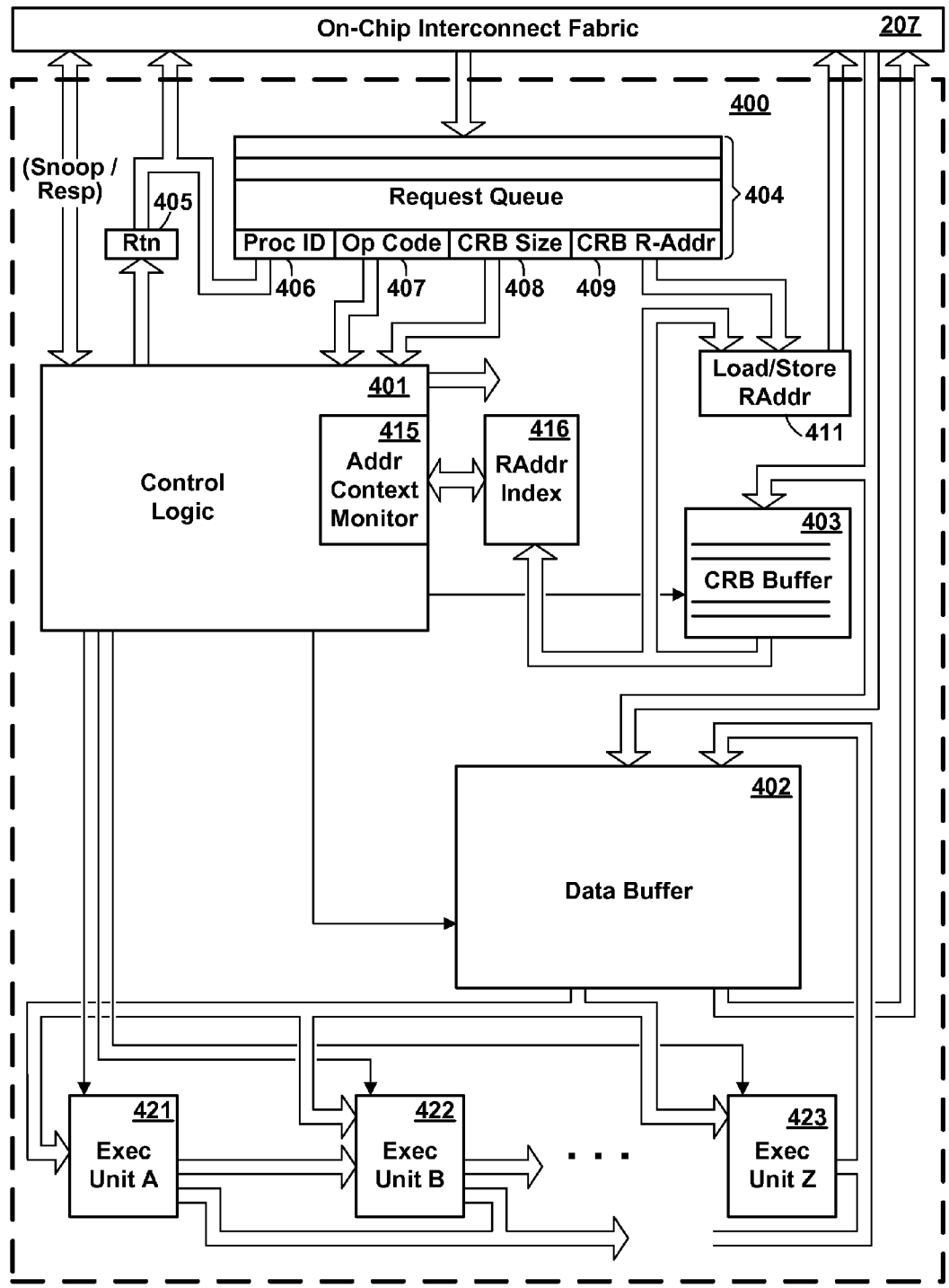
FIG. 4 is a high-level diagram of the major components of a coprocessor, according to the preferred embodiment.

FIG. 4 is a high-level diagram of the major components of a coprocessor 400, according to the preferred embodiment, showing the coprocessor in greater detail than is depicted in FIG. 2. Coprocessor 400 shown in FIG. 4 is a generic representation of a functional unit which is not specific to any particular function which might be performed by a coprocessor; coprocessor 400 as represented in FIG. 4 could be any of crypto-engine 211, CRC unit 212, data compression unit 213, or some other functional unit.

Referring to FIG. 4, coprocessor 400 includes control logic 401 which controls the operation of the coprocessor, a coprocessor data buffer 402 for storing data operands, a CRB buffer 403 for storing one or more CRBs corresponding to one or more pending requests for service, a request queue 404 for receiving incoming operation requests, and one or more execution logic units 421-423, of which three are shown in FIG. 4, it being understood that the number of execution logic units may vary, and that coprocessor 400 might be implemented as a single unit. The request queue 404 contains one or more slots, each holding a respective pending request for a coprocessor operation, and having a respective process ID field 406 for storing an identifier of a CPU core (and optionally a thread within the CPU core) which requested the operation, operation type field 407 for storing an operation type to be performed, coprocessor request block (CRB) size field 408 for storing a length of a coprocessor request block, and coprocessor request block (CRB) real address field 409 for storing a real address in memory of a CRB. Coprocessor 400 further includes several special purpose registers, in particular return code register 405 for storing a return code of a requested operation and load/store real address register 411 for storing a real address in memory of a load or store operation.

As an operational overview, a request from a processor core 201 directed to coprocessor 400 includes a process ID, operation type, CRB Size and CRB real address, loaded in fields 406-409 of request queue 404, respectively. Control logic fetches the CRB from the requester's L2 cache at the real memory address contained in CRB real address field 409, using the CRB size field 408 to determine the number of cache lines to fetch. This CRB is stored in CRB Buffer 403. Control logic 401 determines a number of operands using the operation type and/or CRB size. The real address of each operand is stored within the CRB at a corresponding offset from the beginning of the CRB. Control logic uses the real address of each operand to fetch the corresponding operand and stores it in data buffer 402. The data in buffer 402 is used as input to any of execution units 421-423, and results of the operation may be input to a different execution unit or stored in data buffer 402. The real address(es) in memory for storing result data are obtained from the CRB in the same manner as the real address(es) of the input operand(s) as previously described, and the result data in data buffer 402 is then stored in memory at the appropriate real addresses. Control logic generates an appropriate return code in register 405, and the return code, along with the process ID in register 406, are returned when operation completes. Additional details regarding the operation of coprocessor 400 are provided herein.

Significantly, coprocessor 400 operates asynchronously from processor cores 201, and once a processor core has invoked the coprocessor and passed the necessary references to the CRB, the coprocessor requires nothing further from the processor. The processor core can thus continue to execute any instruction thread or threads (provided they are not dependent on the results of the coprocessor operation), without regard to events within the coprocessor.

For its part, the coprocessor has real address references to all required input and output data operands, and requires no further help from the processor. There is, however, one matter which requires attention. Since the mapping between effective addresses and real addresses is subject to change and is not under control of the coprocessor, there exists the possibility that a change will affect the meaning of the real address of the CRB. This might cause the coprocessor to access real addresses having unknown context and allocated to processes other than the one which invoked the coprocessor, seriously affecting data integrity and security of the system. Control logic 401 therefore snoops the TLB invalidation messages on the on-chip interconnect fabric 207 and includes address context monitoring logic 415, which checks TLB invalidation message against real address index 416. Real address index 416 is an index of real memory pages which contain any of the operands referenced in the CRB or CRBs in CRB Buffer 403. Read address index 416 may be organized in any of various ways; for example, the real address index may be a set-associative directory, each entry containing a real page address, an identifier of the corresponding request which references it, and any additional associated data required, in which each real page address maps to a set of the set-associative directory. Alternatively, real address index could be a 2-dimensional bit array of real address ranges and corresponding requests, where each bit indicates whether any address within the range covered by the bit is referenced in the CRB of the corresponding request. Address conflict monitor 415 compares each snooped TLB invalidation message received over the on-chip interconnect fabric with the real addresses referenced by real address index 416. If a conflict is detected, i.e. a TLB invalidation message affects an address referenced by a CRB, then the corresponding requested operation is aborted, and an appropriate return code is returned to the requesting processor.

Coprocessor 400 contains no instruction unit (equivalent to unit 301 of the processor core) and does not execute machine-executable instructions of the processor's instruction set, i.e. instructions storable in addressable memory. In the preferred embodiment, control logic 401 governing the operation of coprocessor 400 is completely hard-wired. Control logic 401 could alternatively be implemented using microcode.

While various CPU and coprocessor components have been described and shown at a high level, it should be understood that the CPU core and coprocessor of the preferred embodiment contain many other components not shown, which are not essential to an understanding of the present invention. For example, a coprocessor may have the capability to support multiple concurrently pending operations, which may be at different stages of sequential execution, and there may be multiple buffers for supporting such operation. Additionally, various additional special purpose registers will be required in a typical design. Furthermore, it will be understood that the CPU core of FIG. 3 and coprocessor of FIG. 4 are simply one example of a CPU/coprocessor architecture, and that many variations could exist in the number, type and arrangement of components within CPU core 201 and/or coprocessor 400, that components not shown may exist in addition to those depicted, and that not all components depicted might be present in a CPU/coprocessor design. For example, the number and configuration of buffers and caches may vary; the number and function of execution unit pipelines may vary; registers may be configured in different arrays and sets; dedicated floating point hardware may or may not be present; etc. Furthermore, CPU core 201 may have a simple or complex instruction set.

Logical Partitioning Overview

In the preferred embodiment, system 100 is logically partitioned. Logical partitioning is a technique for dividing a single large computer system into multiple partitions, each of which behaves in most respects as a separate computer system. Computer system resources may be allocated into discrete sets, such that there is no sharing of a single resource among different partitions; or may be shared on a time interleaved or other basis; or some resources may be allocated into discrete sets while others are shared. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources or share of resources assigned to that partition, and not resources assigned to other partitions. Preferably, each partition is allocated a respective portion of the physical memory (and hence the real address space) of the system, although this is not necessarily the case. Of particular significance herein, each partition has its own effective address space, and processes executing within a partition are constrained to execute within that effective address space.

Logical partitioning is indeed logical rather than physical. At the level of physical hardware as represented in FIGS. 1-4, there is no concept of partitioning. For example, any processor core 201 can access busses which communicate with memory and other components, and thus access any real memory address, I/O interface processor, and so forth. These hardware resources may be shared by and/or allocated to different partitions. From a physical configuration standpoint, there is typically no distinction made with regard to logical partitions. Generally, logical partitioning is enforced by a partition manager, embodied as low-level executable instructions and data, although there may be a certain amount of hardware support for logical partitioning, such as special hardware registers which hold state information. The system's physical devices and subcomponents thereof are typically physically connected to allow communication without regard to logical partitions, and from this hardware standpoint, there is nothing which prevents a task executing in partition A from writing to memory or an I/O device in partition B. The low level code function and/or hardware prevent access to the resources in other partitions. Code enforcement of logical partitioning further means that it is generally possible to alter the logical configuration of a logically partitioned computer system without reconfiguring hardware. In the preferred embodiment described herein, the partition manager is referred to as a "hypervisor".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each logical partition can be executing a different operating system or environment. Finally, isolation of tasks and resources makes it more difficult for a process executing in one partition to access resources in another partition, thus providing greater security.

Additional background information regarding logical partitioning can be found in the following commonly owned patents and patent applications, which are herein incorporated by reference: Ser. No. 11/191,402, filed Jul. 28, 2005, entitled Method and Apparatus for Maintaining Cached State Date for One or More Shared Devices in a Logically Partitioned Computer System; Ser. No. 10/977,800, filed Oct. 29, 2004, entitled System for Managing Logical Partition Preemption; Ser. No. 10/857,744, filed May 28, 2004, entitled System for Correct Distribution of Hypervisor Work; Ser. No. 10/624,808, filed Jul. 22, 2003, entitled Apparatus and Method for Autonomously Suspending and Resuming Logical Partitions when I/O Reconfiguration is Required; Ser. No.

10/624,352, filed Jul. 22, 2003, entitled Apparatus and Method for Autonomically Detecting Resources in a Logically Partitioned Computer System; U.S. Pat. No. 7,076,570 to Ahrens et al., entitled Method and Apparatus for Managing Service Indicator Lights in a Logically Partitioned Computer System; U.S. Pat. No. 7,028,157 to Block et al., entitled On-Demand Allocation of Data Structures to Partitions; U.S. Pat. No. 7,139,855 to Armstrong et al., entitled High Performance Synchronization of Resource Allocation in a Logically-Partitioned Computer System; Ser. No. 10/422,425, filed Apr. 24, 2003, entitled Selective Generation of an Asynchronous Notification for a Partition Management Operation in a Logically-Partitioned Computer; U.S. Pat. No. 7,076,634 to Lambeth et al., entitled Address Translation Manager and Method for a Logically Partitioned Computer System; Ser. No. 10/422,190, filed Apr. 24, 2003, entitled Grouping Resource Allocation Commands in a Logically-Partitioned System; U.S. Pat. No. 7,133,994 to Abbey, entitled Configuration Size Determination in a Logically Partitioned Environment; U.S. Pat. No. 7,155,629 to Lange-Pearson et al., entitled Virtual Real Time Clock Maintenance in a Logically Partitioned Computer System; U.S. Pat. No. 6,957,435 to Armstrong et al., entitled Method and Apparatus for Allocating Processor Resources in a Logically Partitioned Computer System; U.S. Pat. No. 6,766,398 to Holm et al., entitled A Method for Processing PCI Interrupt Signals in a Logically Partitioned Guest Operating System; U.S. Pat. No. 6,820,164 to Holm et al., entitled A Method for PCI Bus Detection in a Logically Partitioned System; U.S. Pat. No. 6,662,242 to Holm et al., entitled Method for PCI I/O Using PCI Device Memory Mapping in a Logically Partitioned System; U.S. Pat. No. 6,912,493 to Scheel et al., entitled Technique for Configuring Processors in System With Logical Partitions; U.S. Pat. No. 6,438,671 to Doing et al., entitled Generating Partition Corresponding Real Address in Partitioned Mode Supporting System; U.S. Pat. No. 6,467,007 to Armstrong et al., entitled Processor Reset Generated Via Memory Access Interrupt; U.S. Pat. No. 6,681,240 to Armstrong et al, entitled Apparatus and Method for Specifying Maximum Interactive Performance in a Logical Partition of a Computer; U.S. Pat. No. 6,959,291 to Armstrong et al, entitled Management of a Concurrent Use License in a Logically Partitioned Computer; U.S. Pat. No. 6,691,146 to Armstrong et al., entitled Logical Partition Manager and Method; U.S. Pat. No. 6,279,046 to Armstrong et al., entitled Event-Driven Communications Interface for a Logically-Partitioned Computer; U.S. Pat. No. 5,659,786 to George et al., entitled System and Method for Dynamically Performing Resource Reconfiguration in a Logically Partitioned Data Processing System; and U.S. Pat. No. 4,843,541 to Bean et al., entitled Logical Resource Partitioning of a Data Processing System. The latter two patents describe implementations using the IBM S/360, S/370, S/390 and related architectures, while the remaining patents and applications describe implementations using the IBM i/Series™, AS/400™, and related architectures or variants thereof, it being understood that other system architectures could be used.

Figure 5:
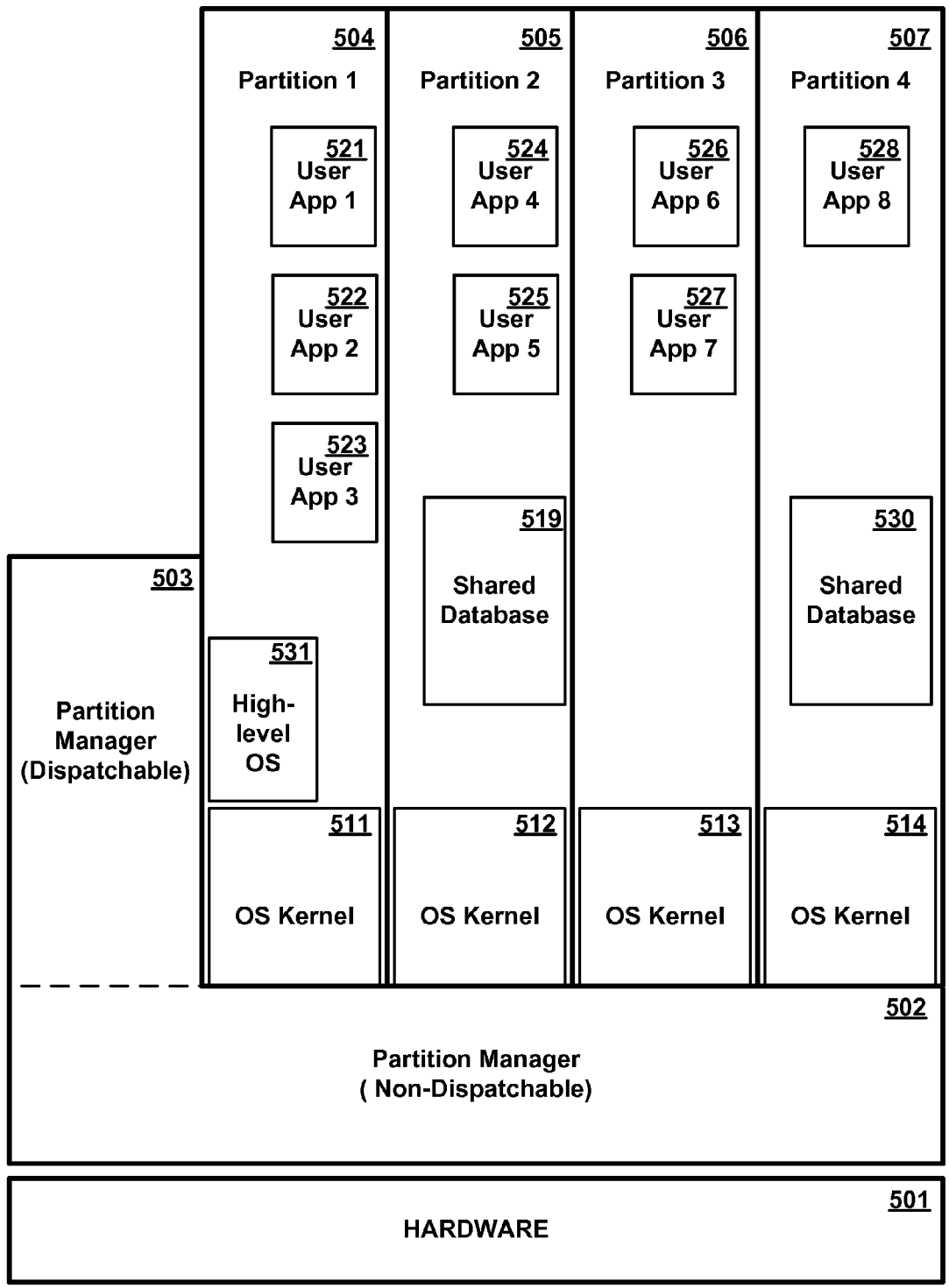
FIG. 5 is a conceptual illustration showing the existence of logical partitions at different hardware and software levels of abstraction in computer system, according to the preferred embodiment.

FIG. 5 is a conceptual illustration showing the existence of logical partitions at different hardware and software levels of abstraction in computer system 100. FIG. 5 represents a system having four logical partitions 504-507 available for user applications, designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 5, the "higher" levels of abstraction are represented toward the top of the figure, while lower levels are represented toward the bottom.

As shown in FIG. 5 and explained earlier, logical partitioning is a code-enforced concept. At the hardware level 501, logical partitioning does not exist. As used herein, hardware level 501 represents the collection of physical devices (as opposed to data stored in devices), such as processors, memory, buses, I/O devices, etc., shown in FIGS. 1-4, including other hardware not shown in FIGS. 1-4, if any. As far as a CPU core 201 is concerned, it is merely executing machine level instructions. In the preferred embodiment, each CPU core 201 is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 5 as a single entity 501, which does not itself distinguish among logical partitions.

Partitioning is enforced by a partition manager (also known as a "hypervisor"), consisting of a non-relocatable, non-dispatchable portion 502 (also known as the "non-dispatchable hypervisor"), and a relocatable, dispatchable portion 503. The hypervisor is super-privileged executable code which is capable of accessing resources, and specifically processor resources and memory, in any partition. The hypervisor maintains state data in various special purpose hardware registers, and in tables or other structures in general memory, which govern boundaries and behavior of the logical partitions. Among other things, this state data defines the allocation of resources in logical partitions, and the allocation is altered by changing the state data rather than by physical reconfiguration of hardware.

In the preferred embodiment, the non-dispatchable hypervisor 502 comprises non-relocatable instructions which are executed by CPU core 201 just as instructions for tasks executing in the partitions. The code is non-relocatable, meaning that the code which constitutes the non-dispatchable hypervisor is at a fixed, reserved range (not necessarily contiguous) of real addresses in memory. These real addresses do not correspond to any effective or virtual address in a partition address space, i.e. there is no effective address in the address space of a partition which would map to a real address in the reserved range of the non-dispatchable hypervisor. Non-dispatchable hypervisor 502 has access to the entire real memory range of system 100. The dispatchable hypervisor code 503 (as well as all partitions) is contained at addresses which are relative to a logical partitioning assignment, and therefore this code is relocatable. The dispatchable hypervisor behaves in much the same manner as a user partition (and for this reason is sometimes designated "Partition 0"), but it is hidden from the user and not available to execute user applications. In general, non-dispatchable hypervisor 502 handles assignment of tasks to physical processors, memory mapping and partition enforcement, and similar essential partitioning tasks required to execute application code in a partitioned system, while dispatchable hypervisor 503 handles maintenance-oriented tasks, such as creating and deleting partitions, altering partition definitions, certain concurrent hardware maintenance, etc. A special user interactive interface is provided into dispatchable hypervisor 503, for use by a system administrator, service personnel, or similar privileged users.

As represented in FIG. 5, there is no direct path between higher levels (levels above non-dispatchable hypervisor 502) and hardware level 501. While machine instructions of tasks executing at higher levels can execute directly on the processor, access to resources (and particularly memory resources) is controlled by the non-dispatchable hypervisor. Non-dispatchable hypervisor 502 enforces logical partitioning of processor resources by presenting a partitioned view of hardware to the task dispatchers at higher levels. I.e., task dispatchers at a higher level (the respective operating systems) dispatch tasks to virtual processors defined by the logical partitioning parameters, and the hypervisor in turn dispatches virtual processors to physical processors at the hardware level 501 for execution of the underlying task. The hypervisor also enforces partitioning of other resources, such as allocations of memory to partitions, and routing I/O to I/O devices associated with the proper partition.

Above non-dispatchable hypervisor 502 are a plurality of logical partitions 504-507. Each logical partition behaves, from the perspective of processes executing within it, as an independent computer system, having its own resource allocation. In particular, each partition has a respective address space, which is not shared with other partitions. The sizes of these partition address spaces may be the same or may be different. Processes executing within a partition (whether OS kernel processes or processes at a higher level) execute in the context of this partition address space. Addresses within this partition address space are a form of effective address, since they do not correspond to fixed persistent locations in physical memory and are mapped to real addresses.

Each logical partition contains a respective operating system kernel herein identified as the "OS kernel" 511-514. In general, each OS kernel 511-514 performs roughly equivalent functions. However, it is not necessarily true that all OS kernels 511-514 are identical copies of one another, and they could be different versions of architecturally equivalent operating systems, or could even be architecturally different operating system modules. OS kernels 511-514 perform a variety of task management functions, such as task dispatching, paging, enforcing data integrity and security among multiple tasks, and so forth. In general, certain low-level OS Kernel processes may reference addresses in the partition address space directly, but most processes within a partition will use another level of effective address space, which is mapped to the partition address space, and ultimately to the real address space. The mappings to real addresses are governed by non-dispatchable hypervisor 502. In the preferred embodiment, this is accomplished by calling the non-dispatchable hypervisor to manage the page table whenever a page is loaded from storage. However, it might alternatively be accomplished by other means, e.g., partitioning real memory on fixed boundaries and allowing the OS kernels to manage pages within each respective real memory portion.

Above the OS kernels in each respective partition there may be a set of high-level operating system functions, and user application code, databases, and other entities accessible to the user. Examples of such entities are represented in FIG. 5 as user applications 521-528, shared databases 529-530, and high-level operating system 531, it being understood that these are shown by way of illustration only, and that the actual number and type of such entities may vary. The user may create code above the level of the OS Kernel, which invokes high level operating system functions to access the OS kernel, or may directly access the OS kernel.

While various details regarding a logical partitioning architecture have been described herein as used in the preferred embodiment, it will be understood that many variations in the mechanisms used to enforce and maintain logical partitioning are possible. Furthermore, although a logically partitioned computer system has been described herein as a preferred embodiment, the present invention is not necessarily limited to use in logically partitioned computer systems, and could have application to any digital data processing system in which effective addresses in an effective address space are translated to real addresses for accessing memory.

It will be understood that FIG. 5 is a conceptual representation of partitioning of various resources in system 100. In general, entities above the level of hardware 501 exist as addressable data entities in system memory. However, it will be understood that not all addressable data entities will be present in memory at any one time, and that data entities are typically stored in storage devices 112 and paged into main memory as required.

Invoking the Coprocessor

In the preferred embodiment, a process thread executing in one of the processor cores invokes the coprocessor to perform a requested operation by generating a coprocessor request block (CRB) and passing a reference to the CRB to the coprocessor. The CRB contains references to any required data, which is then accessed directly by the coprocessor, without intervention of the requesting processor.

The requesting process thread references memory addresses in an effective address space. This effective address space could be any effective address space. For example, it could be an address space associated with the requesting process, or an address space associated with a logical partition in which the process executes, or some other effective address space. However, it is not a real address space, and the effective addresses generated by the requesting process thread require translation to real addresses in order to access memory. Because the effective addresses of the thread are not real addresses, the process is sometimes referred to herein as an "unprivileged" process, to distinguish it from certain low-level privileged processes (such as a non-dispatchable hypervisor process, or in the case of a non-partitioned system, certain low-level OK kernel processes) which directly address real memory. It should be understood that the process is "unprivileged" only in the sense that it does not directly reference real addresses, and may have certain privileges in some other sense.

The coprocessor, on the other hand, contains no address translation mechanism and accesses memory only with real addresses. The requesting process thread therefore uses the secure address translation mechanism 324 within the processor to populate the CRB with references to real addresses to which it has authorized access, and provides a real address reference to the CRB itself to the coprocessor, from which the coprocessor is able to access any required data in memory.

Figure 6A:
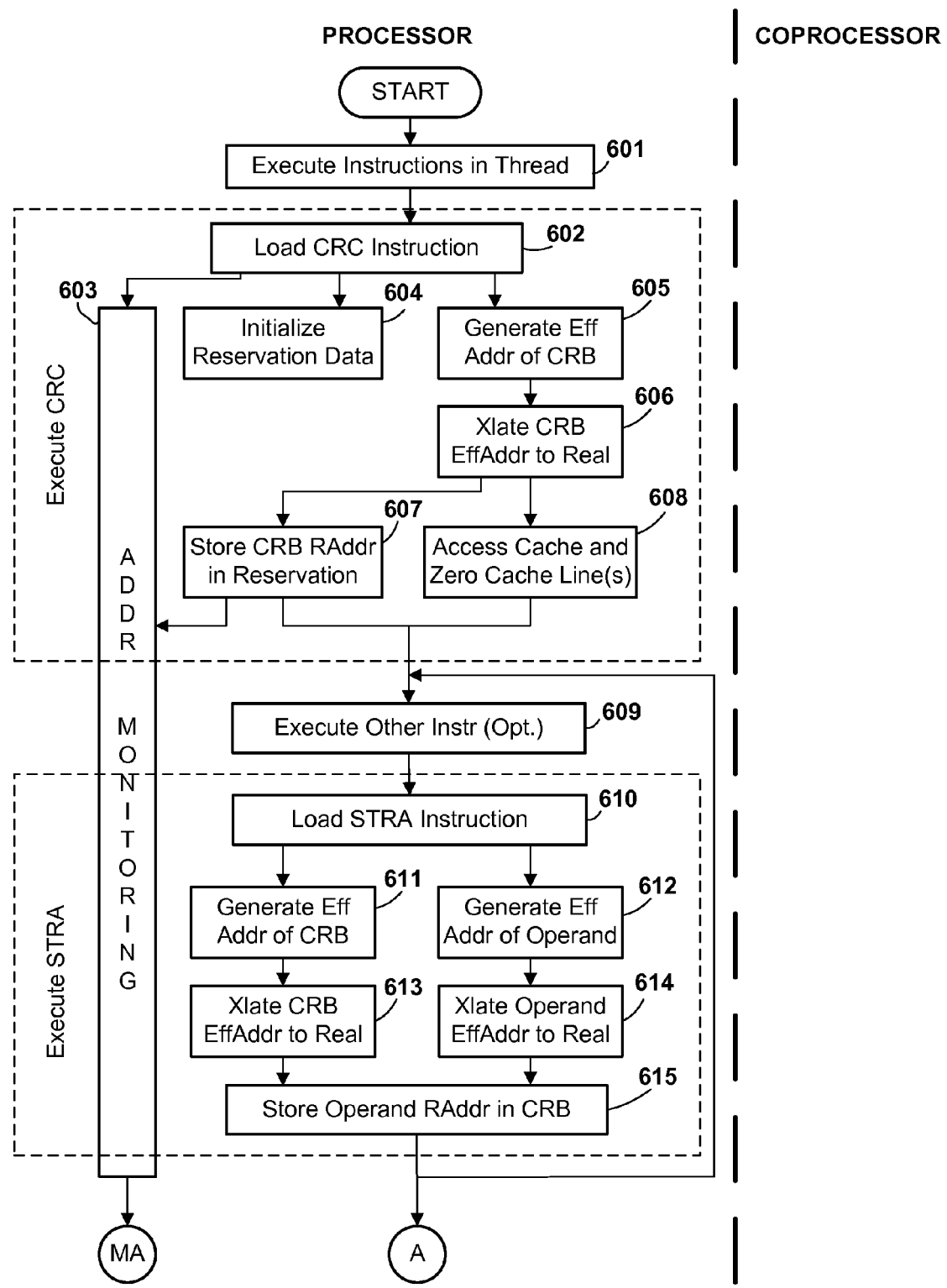
FIG. 6 is a flow diagram showing the actions taken to invoke the coprocessor on behalf of an unprivileged process executing within a processor core, according to the preferred embodiment.
Figure 6B:
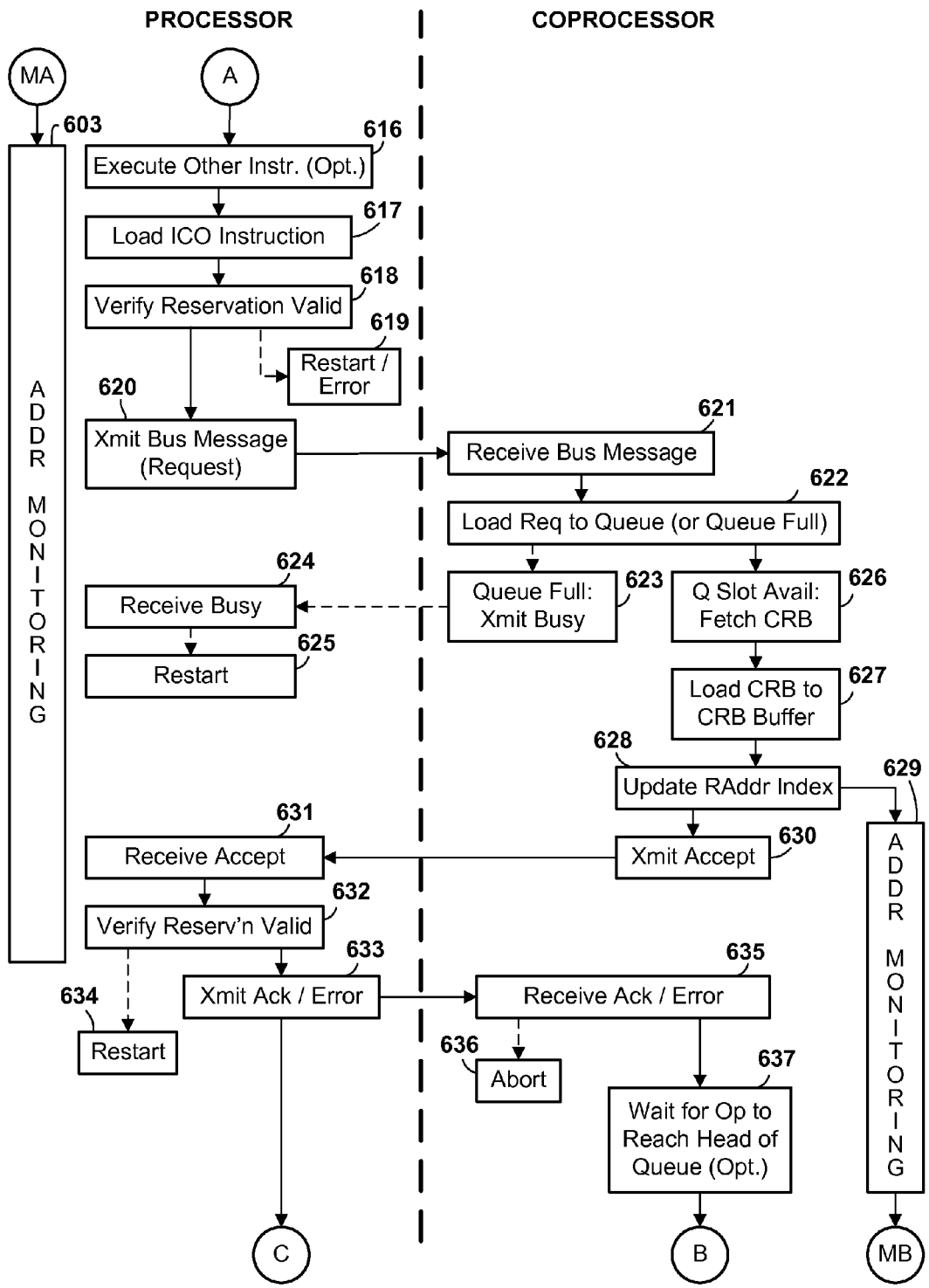
Figure 6C:
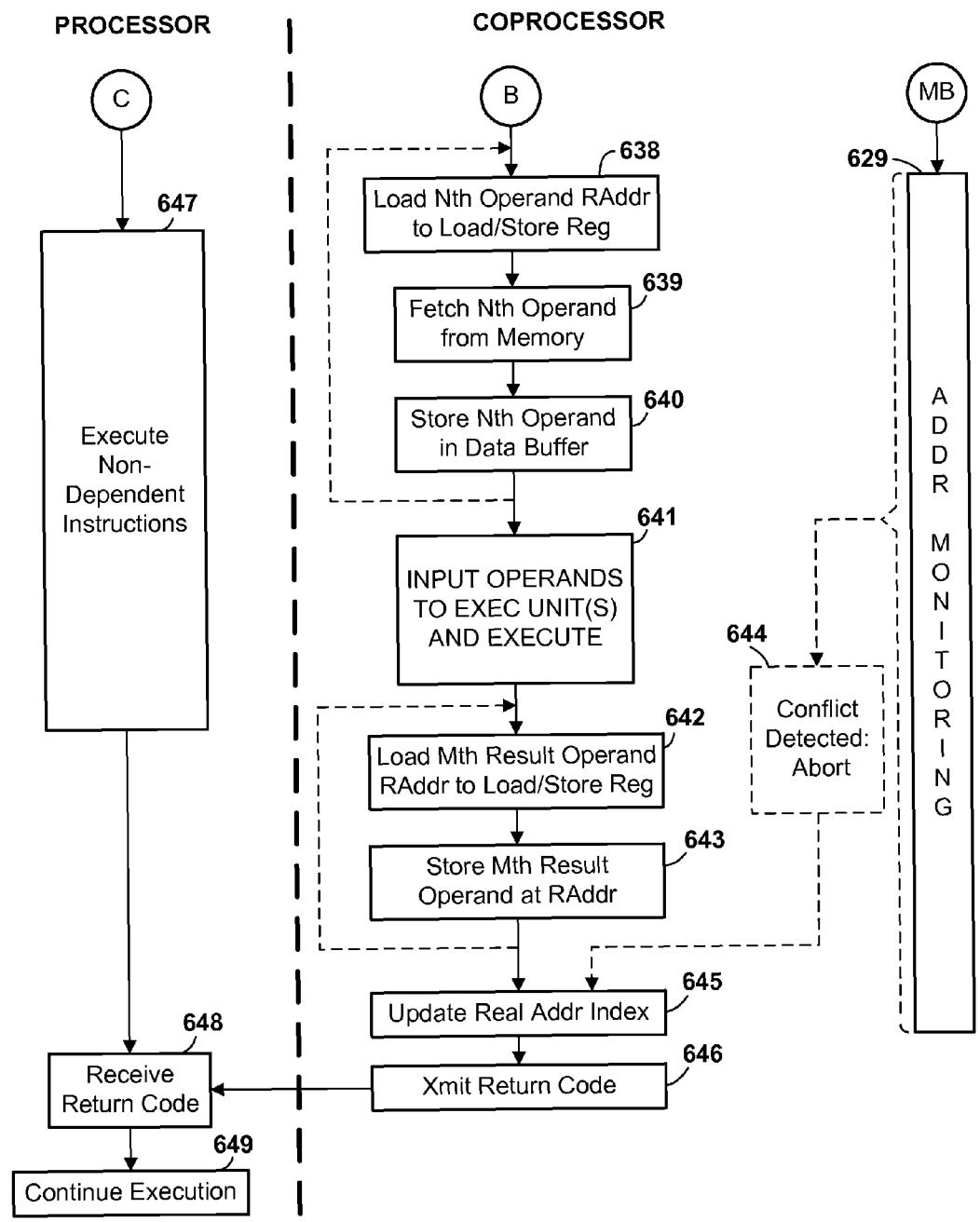

FIGS. 6A-6C (herein collectively referred to as FIG. 6) are a flow diagram showing the actions taken to invoke coprocessor 400 on behalf of an unprivileged process executing within a processor core 201, according to the preferred embodiment. In this embodiment, the processor core's instruction set contains three special purpose instructions used to support coprocessor operation: a "create reservation and clear (CRC)", a "store real address" (STRA), and an "initiate coprocessor operation" (ICO). The CRC instruction is used to zero the contents of a specified block of storage to be used as a CRB, and apply the coprocessor reservation attribute to it. The STRA instruction is used to obtain and store a real address within the CRB. The ICO instruction is used to invoke the coprocessor once the CRB has been prepared. These instructions and others are contained in the thread which invokes the coprocessor. In FIG. 6, actions performed within the processor core 201 are generally represented on the left side of the central division line in the figure, while actions performed by the coprocessor 400 are generally represented on the right side of the central division line.

Referring to FIG. 6, processor core initially executes a sequence of instructions of a thread, represented as block 601. For simplicity of illustration, a single thread is represented in which the instructions are all sequential. However, depending on the processor design, processor core 201 may support multiple active threads simultaneously, and may be capable of executing multiple instructions concurrently and/or executing instructions out of order, whether from the same or different threads.

At some point in executing the thread, instruction unit 301 loads a CRC instruction for execution in an instruction register (block 602), which may be the only instruction register, or one of several. The operands of the CRC instruction include an effective address reference for a block of memory (which will become the CRB) and a block size. In the preferred embodiment, the size is an integral number of cache lines, although a size parameter could be other than an integral number of cache lines. The processor executes the CRC instruction by initializing reservation data 308 (which includes setting the reservation valid bit and storing the CRB size) (block 604), and generating the effective address of the CRB from the operand(s) of the CRC instruction (block 605). For example, the CRC instruction could have a reference to a register containing the effective address, references to multiple registers whose contents are added to obtain the effective address, an address offset which is added to the contents of a register, the full effective address as an operand, or any other conventional means for generating an effective address. Once the effective address of the CRB is generated, the processor core uses address translation mechanism 324 to translate the effective address to the real address of the CRB (block 606). Having been obtained from the secure address translation mechanism 324, this real address is necessarily one to which the executing processes has authorized access. Since the hardware contains no restriction on the range of effective address of the CRB, it is theoretically possible that the effective address being translated is not in the TLB, requiring access to lower levels of cache, or memory, or possibly even causing a page fault. These various events are not represented in FIG. 6, but it should be understood that the processor handles these just as it would any other address translation. In general, it is expected that a CRB will be local to other data of the active thread, and therefore in the vast majority of cases the address will already be in the TLB.

Once the effective address of the CRB has been translated to a real address, this real address is stored in reservation data 308 (block 607). The real address is also used to zero the entire contents of the referenced block, i.e. one or more cache lines of the L2 cache (block 608). If the line or lines corresponding to the block's real address are already within the L2 cache, they are zeroed. If not, one or more lines already in the L2 cache are evicted, their contents are zeroed, and the cache directory is updated, to create one or more cache lines corresponding to the block's real address. It will be observed that it is not necessary in this case to load a cache line from memory into the L2 cache, because the line will be zeroed anyway. If, however, the line is not in main memory, then a page fault will be generated in attempting to translate the effective address to real, and the corresponding page will be loaded into memory. In general, it is expected that a page fault will rarely occur.

The execution of the CRC instruction is the only means by which the hardware can set a validity bit in reservation data 308 to a valid state and reserve a CRB at a real address. However, the validity bit is reset automatically by reservation conflict monitor 307 (the reservation lost) as a result of any of various events, which the context monitor hardware monitors continually once the bit is set. This hardware monitoring is represented in FIG. 6 as block 603. The exact nature of the events which the hardware monitors will depend on the architecture, but in general, these events fall into one of two categories: (a) an event which may have the effect of altering the effective address context represented by the real address of the CRB or any real address stored therein, or (b) an event which may have the effect of unauthorized altering of data within the CRB. Either type of event could cause the coprocessor to subsequently access a real address to which the executing process is not authorized.

In the preferred embodiment, events of type (a) are satisfactorily monitored by monitoring TLB invalidate operations, and resetting the reservation bit (cancelling the reservation) in the event of any TLB invalidate. It will be observed that this casts a broad net (for most TLB entries will not relate to the CRB address or an address within it), but it is easily implemented, and it is expected that only rarely will a TLB invalidate occur while the processor is building and issuing coprocessor request with the CRC, STRA and ICO instructions. It would alternatively be possible to reset the reservation bit only for some subset of TLB invalidate operations which might affect the relevant addresses, but hardware required for this is more complex.

Events of type (b) preferably include: (i) any store of data into the CRB by an instruction other than a STRA instruction; (ii) any store of data into the CRB by another hardware thread executing in the same core; (iii) any attempt to alter the CRB from outside the processor core owning the reservation, such as cache line insertion, direct memory access (DMA) from an I/O device writing into memory, or any loss or change ownership of any cache line of the CRB, including eviction from the L2 cache (such an event makes it impossible for conflict monitor 307 to monitor all accesses to the CRB); (iv) any attempt by another hardware thread on any processor core to execute a CRC instruction to the same block of storage; and (v) any subsequent CRC instruction by the thread holding the coprocessor reservation (i.e., a thread may hold only one coprocessor reservation at a time). Any of these events automatically cause the monitoring hardware to reset the reservation valid bit in reservation data 308. Depending on the architecture, there may be additional events which cause loss of the coprocessor reservation.

Certain events can be monitored almost immediately upon loading and decoding the CRC instruction at block 602 (e.g., any TLB invalidate operation), while others require that the CRB real address be known and stored in reservation data at block 607.

After execution of the CRC instruction (which is performed only once), the processor will populate the CRB with real addresses of operands by executing the STRA instruction one or more times. An STRA instruction may, but need not necessarily, immediately follow the CRC instruction. As represented by block 609, the processor may optionally execute one or more other instructions of the thread before encountering the STRA instruction.

The instruction unit then loads the STRA instruction (block 610). The STRA instruction contains at least two operands. One is a reference to an effective address within the CRB at which a real address of an operand for use by the coprocessor (coprocessor operand) will be stored; the other is a reference to the effective address of the coprocessor operand. The processor core executes the STRA instruction by generating the effective address at which the real address of the coprocessor operand will be stored, using any of various means to generate an effective address as described above with respect to block 605 (block 611). The processor core then uses the secure address translation mechanism 324 to translate the effective address at which the real address of the coprocessor operand is to be stored to the real address (within the CRB) at which the real address of the coprocessor operand will be stored (block 613). Because it was translated by address translation unit 324, this is a real address to which the executing process has authorized access.

Additionally, the processor core generates the effective address of the coprocessor operand, using any of various means to generate an effective address as described above with respect to block 605 (block 612). The processor core then uses the address translation mechanism 324 to translate the effective address of the coprocessor operand to the real address of the coprocessor operand (block 614). Because it was translated by address translation unit 324, this is a real address to which the executing process has authorized access.

The real address of the coprocessor operand so derived is then stored in the CRB (i.e., in the corresponding cache line) at the real address derived in block 613 (block 615). Execution of the STRA instruction may be repeated an arbitrary number of times to store an arbitrary number of coprocessor operand addresses in the CRB, represented in FIG. 6 by the line of control returning to block 609.

Once reserved, the CRB can only be accessed by the STRA instruction. Since the STRA instruction produces real addresses through the secure address translation mechanism 324, any real address stored in the CRB is one to which the requesting process has authorized access. Conflict monitor 307 monitors L2 cache accesses to prevent unauthorized access to the CRB. It will be observed that the STRA instruction could be used to store a real address at any arbitrary location to which the requesting process has access, but only a location within the CRB will be usable by the coprocessor. Storing a real address at some other arbitrary location will not enable the requesting process to access that real address directly, since an unprivileged process can only access effective addresses translated through the secure address translation mechanism.

It will be observed that the execution of the STRA instruction only stores a reference to a coprocessor operand (in the form of a real address) in the CRB. The invoking process is responsible for preparing any necessary data at this address, to the extent any preparation is required. This is generally done before execution of the STRA instruction, and can be performed using any conventional instruction which references the effective address of the data.

After the CRB is populated with real address references to coprocessor operands by executing the STRA instruction one or more times, the processor will invoke a coprocessor by executing the ICO instruction. As in the case of the STRA instructions, the ICO instruction may, but need not necessarily, immediately follow the STRA instructions. As represented by block 616, the processor may optionally execute one or more other instructions of the thread before encountering the ICO instruction.

The instruction unit then loads the ICO instruction for execution (block 617). The ICO instruction causes the processor to verify the validity bit in the reservation data 308 (block 618). If the bit has been reset for any reason, then there is at least a possibility that either the real address of the CRB itself or the addresses stored within the CRB no longer have their original context or have been altered, either of which could result in unauthorized data accesses by the coprocessor when it attempts to access data at these real addresses. Accordingly, further processing of the coprocessor request is aborted, represented as block 619. The action to be taken upon aborting the coprocessor request will vary with the architecture and reason for resetting the reservation valid bit. For example, a reason code could be saved in a status register. An error recovery routine could examine this status register to determine the reason, and either re-execute the CRC and STRA instructions, issue an unresolved error message and abort processing, or take some other action, depending on the reason. Certain actions, such as a TLB invalidate, causing loss of the reservation are considered normal although infrequent, and the proper response is to simply re-execute the CRC and STRA instructions. Other actions, such as another CRC instruction by the same process, are considered abnormal, and will cause the underlying process to abort.

If the reservation is still valid, a bus message is transmitted to the coprocessor to request the coprocessor operation (block 620). This bus message will include, among other things: (a) the real address of the CRB, from the reservation data 308; (b) the size of the CRB, also from reservation data 308; (c) an operation code specifying the operation requested of the coprocessor, which will be obtained as an operand of the ICO instruction itself; and (d) an identifier of the requesting processor (and thread, if more than one thread can request a coprocessor operation at the same time). These correspond to data which will be loaded to fields 409, 408, 407 and 406, respectively, in the coprocessor's request queue.

The coprocessor receives the bus message (block 621) and loads the data to its request queue 404, if space is available in the queue (block 622). If no space is available on the queue, the coprocessor returns a busy message to the requesting processor (block 623). This message is received in the requesting processor (block 624), which then restarts the request (block 625) or takes other appropriate action (such as swapping the requesting thread out to a wait queue, as it would for a long latency event).

If space was available in the queue, the coprocessor fetches the CRB using the CRB's real address and size, which were passed in the request (block 626). The CRB is in the requestor's L2 cache, and is fetched from that location. The CRB is then loaded to CRB buffer 403 (block 627).

Once the CRB has been fetched and loaded into CRB buffer 403, any subsequent alteration of the CRB within the requesting processor's L2 cache or memory, or any subsequent change in the real address context of the CRB itself, will not affect the proper operation of the coprocessor, since the contents of the coprocessor's CRB buffer are unaffected by such events. However, a change in the real address context of any operand real address contained within the CRB could affect data integrity or security, since these real addresses will be used by the coprocessor to load and store operand data.

In order to avoid accesses to unauthorized locations in real memory, the coprocessor hardware is continually monitoring the on-chip interconnection fabric 207 for TLB invalidation messages. The receipt of a TLB invalidation message indicates a possible change to the context of the an operand real address stored in the CRB, which could cause access to an unauthorized real address.

In order to properly monitor the TLB invalidation messages, real address index 416 contains the real address of each real memory page which is referenced by any operand real address reference in a CRB stored in CRB buffer 403. With the CRB loaded to the CRB buffer at block 627, the coprocessor updates the real address index 416 to include an entry for each real memory page referenced by any operand real address in the CRB which was just stored (block 628). I.e., the real addresses in the CRB are parsed, compared with real address index 416, and an entry is added to the index if any real address in a CRB is not already covered by the index. It is possible that multiple operand references will be contained in the same real memory page, in which case only one entry per page is required. It is also possible, although somewhat unlikely, that multiple CRBs corresponding to multiple requests in the request queue could reference the same real memory page. In this case, the real address index might contain redundant entries for the real memory page corresponding to each such request, or might contain additional data to indicate the multiple requestors.

Once the real address index 416 has been updated at block 628, address context monitor 415 will identify any TLB invalidation message affecting an operand real address in the requested operation, and will cause the operation to abort if such a TBL invalidation message is encountered. This monitoring is represented as block 629, it being understood that in fact address context monitor is continually examining TLB messages, but will only effectively identify TLB invalidation messages relevant to the received request after the real address index has been updated.

With the real address index updated and address monitoring effectively enabled, the coprocessor sends an accept message back to the requesting processor (block 630).

The requesting processor receives the accept message (block 631). The processor again verifies the state of the reservation (block 632). If the reservation is still valid, the processor will send an acknowledgment (block 633), allowing the coprocessor to proceed with the operation. If the reservation has been lost since it was last verified, then it can not be definitely known whether the coprocessor began monitoring (block 629) before the potentially invalidating event. Therefore the processor restarts the request (block 634) and sends an error message at block 633 instead of an acknowledgment, causing the coprocessor to abort the operation. Restarting, represented as block 634, is essentially the same as block 619. Once the processor has verified the state of the reservation at block 632, it is not longer necessary for the requesting processor to monitor the CRB or addresses within the CRB, and monitoring (block 603) terminates.

The coprocessor receives the acknowledgment or error message as the case may be (block 635), and aborts operation if an error message is received (block 636). In the event of an acknowledgment, the coprocessor proceeds to perform the requested operation. It may have to wait until other operations previously in its request queue are first processed (block 637).

To perform the operation, the coprocessor loads one or more operands from memory. In reality, the data is typically in cache because generally it was very recently referenced by the processor which invoked the coprocessor operation. To load an operand, the coprocessor obtains the operand's real address from the CRB and stores it in load/store register 411 (block 638). The coprocessor then sends a load command on the on-chip interconnect fabric to fetch the data at the real address in register 411, i.e. to fetch the corresponding operand (block 639). When this operand data is returned, it is stored in data buffer 402 (block 640).

Blocks 638-640 may be repeated an arbitrary number of times to load whatever data is required. At some point, operand data from data buffer 402 will be input to one or more execution units to perform the required function, shown as block 641. It will be understood that while FIG. 6 represents the input to the execution units at block 641 occurring after all operands have been loaded from memory, it is possible to input some operands to an execution unit, and later load additional operands, which are further input to the same or a different execution unit, and that this process could continue indefinitely.

Result data from execution unit operations is stored in data buffer 402. At some point, this data may need to be stored in memory. The real address at which the data is to be stored is obtained from the CRB and placed in load/store register 411 (block 642). The coprocessor then sends a store command on the on-chip interconnect fabric to store the data at the real address in register 411 (block 643). When this operand data is returned, it is stored in data buffer 402 (block 640). Blocks 642-643 may be repeated an arbitrary number of times to store an arbitrary number of result operands. Although FIG. 6 represents all result operands being stored after input operands are obtained and data in input to the execution unit(s), some result operands may be stored before all execution unit operations are complete or before all input operands are loaded.

When all coprocessor operation is complete and all result data stored, the coprocessor updates the real address index 416 by deleting any entries for real memory pages used only by the current request (block 645). This has the effect of discontinuing address monitoring of the corresponding real memory pages (block 629). If address monitoring detects a TLB invalidate message for a memory page referenced by the CRB during coprocessor handling of the request, the request is immediately aborted (shown as block 644), and control proceeds to block 645.

The coprocessor then returns an operation return code message to the requesting processor (block 646). This message contains a return code indicating the status of the operation (completed normally, aborted, etc) and a process ID from field 406. Depending on the type of operation and other factors, if a coprocessor operation is aborted before completion (e.g., block 644), it is possible that partial results exist and that coprocessor operation may be later resumed at the stage at which it was aborted. Any return code would indicate such information.

From the time that the processor dispatches the coprocessor request, it may execute additional instructions asynchronously with any activity occurring in the coprocessor, provided that those instructions are not dependent on the results of coprocessor operation (and will not affect coprocessor required data). This is represented in FIG. 6 as block 647. When the processor receives the return code from the coprocessor (block 648), it then continues execution (block 649). If the return code indicates successful completion of the coprocessor operation, execution at block 649 can include use of any results produced by the coprocessor.

A particular form of address context monitoring has been described herein, wherein separate hardware monitors within the processor and the coprocessor detect the occurrence of certain events and take appropriate action as described to ensure that data integrity and security are not compromised. However, address context monitoring could assume any of a variety of different embodiments, and that the specific types of events which are monitored may vary. In general, there is a design trade-off between circuit complexity and execution efficiency. Very simple monitors may use relatively simple event filtering, resulting in a relatively larger number of false positives, i.e., events detected as affecting a real address, which in fact do not in fact affect the integrity of the coprocessor operation. More complex monitors may reduce the number of false positives at the expense of increased circuit complexity to enable more complex event filtering. Additionally, address context monitoring could be implemented in a single monitor, which could be within the processor or within the coprocessor or independent. For example, the processor could transmit a message to an external monitor to begin monitoring at the time the CRC or equivalent instruction is executed, and/or a monitor external to the coprocessor could cause the coprocessor to abort the operation if a relevant event is detected.

In the preferred embodiment as described above, the CRB contains one or more real addresses of the data operands used by the coprocessor to perform the requested operation, so that the coprocessor first accesses the CRB using the real address which is passed to it in the request message to obtain the real addresses of the data operands, and then accesses the data operands themselves using these real addresses from the CRB. This arrangement reduces the size of the CRB to a minimum (typically a single cache line) while supporting a potentially much larger range of operand data. However, it would alternatively be possible to include the data operands directly within the CRB, thus eliminating the need for a second memory access to obtain the data operand. This alternative may be attractive where the number and size of operands is relatively small. It would be possible to support both modes of real memory access within the same coprocessor by using different modes for different operation types, or by providing a flag field within the request message, or other means. Accordingly, in one case the coprocessor would treat data within the CRB as a set of real addresses referencing the data operands, and in the other case would treat data within the CRB as the data operands themselves.

Although a specific embodiment of the invention has been disclosed along with certain alternatives, it will be recognized by those skilled in the art that additional variations in form and detail may be made within the scope of the following claims.

What is claimed is:

1. A digital data processing system, comprising:
   a memory defining a real address space;
   a processor for executing processes embodied as instructions storable in said memory, at least some of said processes generating memory references in a respective effective address space different from said real address space;
   a coprocessor performing operations, each operation on behalf of a respective process executing in said processor, said coprocessor accessing data operands in said memory using real addresses in said real address space;
   wherein said processor invokes said coprocessor to perform a first operation on behalf of a first process, said first process generating memory references in a first effective address space, by:
   generating a first effective address in said first effective address space;
   translating said first effective address to a first real address in said real address space;
   transmitting a request to perform said first operation to said coprocessor, said request containing said first real address;
   wherein said coprocessor uses said first real address to access at least one data operand for performing said first operation.

2. The digital data processing system of claim 1,
   wherein said digital data processing system comprises a plurality of processors for executing processes embodied as instructions storable in said memory;
   wherein said coprocessor is shared among said plurality of processors, each operation performed by said coprocessor on behalf of a respective process executing in a respective processor of said plurality of processors;
   wherein each said processor invokes said coprocessor to perform respective operations on behalf of respective processes executing in the respective processor, each respective process generating respective memory references in a respective effective address space, by:
   generating a respective first effective address in the respective effective address space;
   translating the respective first effective address to a respective first real address in said real address space;
   transmitting a respective request to perform the respective operation to said coprocessor, the respective request containing the respective first real address;
   wherein said coprocessor uses the respective first real address to access at least one respective data operand for performing the respective operation.

3. The digital data processing system of claim 1,
   wherein said processor invokes said coprocessor to perform said first operation on behalf of said first process by additionally:
   generating a second effective address in said first effective address space of a first data operand for performing said first operation;
   translating said second effective address to a second real address in said real address space; and
   storing said second real address in a block of memory referenced by said first effective address;
   wherein said coprocessor uses said first real address to access said second real address in said block of memory, and uses said second real address to access said first data operand.

4. The digital data processing system of claim 3,
   wherein said processor invokes said coprocessor to perform said first operation on behalf of said first process by additionally:
   generating a plurality of second effective addresses in said first effective address space, each second effective address of a respective data operand for performing said first operation;
   translating each second effective address to a respective second real address in said real address space; and
   storing each said second real address in said block of memory;
   wherein said coprocessor uses said first real address to access the second real addresses in said block of memory, and uses each said second real address to access the respective data operand.

5. The digital data processing system of claim 1, further comprising:
   an address context monitoring mechanism which detects the occurrence of at least one event affecting at least one of (a) a real address provided to said coprocessor for accessing at least one operand to perform said first operation, and (b) a context of a real address provided to said coprocessor for accessing at least one data operand to perform said first operation.

6. The digital data processing system of claim 5, wherein said at least one event comprises a translation look-aside buffer (TLB) invalidation.

7. The digital data processing system of claim 5, wherein said first real address references a block of memory containing a plurality of second real addresses, each second real address referencing a respective data operand to perform said first operation, and said at least one event comprises a write to said block of memory.

8. The digital data processing system of claim 5, wherein said address context monitoring mechanism comprises:
- a processor portion of said address context monitoring mechanism in said processor for detecting, during a first time interval, the occurrence of at least one event affecting at least one of (a) a real address provided to said coprocessor for accessing at least one operand to perform said first operation, and (b) a context of a real address provided to said coprocessor for accessing at least one data operand to perform said first operation; and
- a coprocessor portion of said address context monitoring mechanism in said coprocessor for detecting, during a second time interval following said first time interval, the occurrence of at least one event affecting at least one of (a) a real address provided to said coprocessor for accessing at least one operand to perform said first operation, and (b) a context of a real address provided to said coprocessor for accessing at least one data operand to perform said first operation.

9. The digital data processing system of claim 1, wherein said digital data processing system is logically partitioned, each partition having a respective effective address space.

10. A method of operating a digital data processing system having a memory defining a real address space, the method comprising:
- executing a first process in a processor of said digital data processing system, said first process generating memory references in an effective address space, addresses in said effective address space being translated to addresses in said real address space for accessing said memory;
- invoking a coprocessor to perform a coprocessor operation on behalf of said first process by:
- generating a first effective address in said effective address space;
- translating said first effective address to a first real address in said real address space;
- transmitting a request to perform said coprocessor operation to said coprocessor, said request containing said first real address;
- accessing, from said coprocessor, at least one data operand for performing said coprocessor operation using said first real address.

11. The method of claim 10,
wherein said processor invokes said coprocessor to perform said first operation on behalf of said first process by additionally:
- generating a second effective address in said first effective address space of a first data operand for performing said first operation;
- translating said second effective address to a second real address in said real address space; and
- storing said second real address in a block of memory referenced by said first effective address;
- wherein said coprocessor uses said first real address to access said second real address in said block of memory, and uses said second real address to access said first data operand.

12. The method of claim 11,
wherein said processor invokes said coprocessor to perform said first operation on behalf of said first process by additionally:
- generating a plurality of second effective addresses in said first effective address space, each second effective address of a respective data operand for performing said first operation;
- translating each second effective address to a respective second real address in said real address space; and
- storing each said second real address in said block of memory;
- wherein said coprocessor uses said first real address to access the second real addresses in said block of memory, and uses each said second real address to access the respective data operand.

13. The method of claim 10, further comprising:
- monitoring the digital data processing system to detect the occurrence of an invalidating event, said invalidating event comprising an event affecting at least one of (a) a real address provided to said coprocessor for accessing at least one operand to perform said first operation, and (b) a context of a real address provided to said coprocessor for accessing at least one data operand to perform said first operation; and
- responsive to detecting an invalidating event, taking at least one corrective action.

14. The method of claim 13, wherein said invalidating event comprises a translation look-aside buffer (TLB) invalidation.

15. The method of claim 13, wherein said first real address references a block of memory containing a plurality of second real addresses, each second real address referencing a respective data operand to perform said first operation, and said invalidating event comprises a write to said block of memory.

16. The method of claim 13, wherein said monitoring the digital data processing system to detect the occurrence of an invalidating event address comprises:
- monitoring in said processor to detect the occurrence of an invalidating event during a first time interval; and
- monitoring in said coprocessor to detect the occurrence of an invalidating event during a second time interval following said first time interval.

17. An integrated circuit chip, comprising:
- a processor core, said processor core for executing processes embodied as instructions storable at addressable locations in a real address space, at least some of said processes generating memory references in a respective effective address space different from said real address space;
- a coprocessor performing operations, each operation on behalf of a respective process executing in said processor core, said coprocessor accessing data operands using real addresses in said real address space;
- wherein said processor core invokes said coprocessor to perform a first operation on behalf of a first process, said first process generating memory references in a first effective address space, by:
- generating a first effective address in said first effective address space;
- translating said first effective address to a first real address in said real address space;
- transmitting a request to perform said first operation to said coprocessor, said request containing said first real address;
- wherein said coprocessor uses said first real address to access at least one data operand for performing said first operation.

18. The integrated circuit chip of claim 17, wherein said integrated circuit chip comprises a plurality of processor cores for executing processes embodied as instructions storable in said memory;

wherein said coprocessor is shared among said plurality of processor cores, each operation performed by said coprocessor on behalf of a respective process executing in a respective processor core of said plurality of processor cores;

wherein each said processor core invokes said coprocessor to perform respective operations on behalf of respective processes executing in the respective processor core, each respective process generating respective memory references in a respective effective address space, by:

generating a respective first effective address in the respective effective address space;

translating the respective first effective address to a respective first real address in said real address space;

transmitting a respective request to perform the respective operation to said coprocessor, the respective request containing the respective first real address;

wherein said coprocessor uses the respective first real address to access at least one respective data operand for performing the respective operation.

19. The integrated circuit chip of claim 17, wherein said processor invokes said coprocessor to perform said first operation on behalf of said first process by additionally:

generating a plurality of second effective addresses in said first effective address space, each second effective address of a respective data operand for performing said first operation;

translating each second effective address to a respective second real address in said real address space; and storing each said second real address in a block of memory referenced by said first effective address;

wherein said coprocessor uses said first real address to access the second real addresses in said block of memory, and uses each said second real address to access the respective data operand.

20. The integrated circuit chip of claim 17, further comprising:

an address context monitoring mechanism which detects the occurrence of at least one event affecting at least one of (a) a real address provided to said coprocessor for accessing at least one operand to perform said first operation, and (b) a context of a real address provided to said coprocessor for accessing at least one data operand to perform said first operation.

* * * * *